United States Patent
Zanghi et al.

(10) Patent No.: US 9,596,870 B2
(45) Date of Patent: Mar. 21, 2017

(54) COMPOSITIONS AND METHODS FOR ENHANCING EXERCISE PERFORMANCE

(71) Applicant: NESTEC SA, Vevey (CH)

(72) Inventors: Brian M. Zanghi, Ballwin, MO (US);
Arleigh J. Reynolds, Salcha, AK (US);
Rondo P. Middleton, Creve Coeur, MO (US)

(73) Assignee: Nestec SA, Vevey (CH)

( * ) Notice: Subject to any disclaimer, the term of this patent is extended or adjusted under 35 U.S.C. 154(b) by 25 days.

(21) Appl. No.: 14/310,359

(22) Filed: Jun. 20, 2014

(65) Prior Publication Data
US 2015/0004279 A1     Jan. 1, 2015

Related U.S. Application Data

(60) Provisional application No. 61/841,011, filed on Jun. 28, 2013.

(51) Int. Cl.
| | |
|---|---|
| *A23K 1/17* | (2006.01) |
| *A23K 1/18* | (2006.01) |
| *A23K 20/147* | (2016.01) |
| *A23K 20/158* | (2016.01) |
| *A23K 20/163* | (2016.01) |
| *A23K 50/40* | (2016.01) |

(52) U.S. Cl.
CPC .......... *A23K 1/1846* (2013.01); *A23K 20/147* (2016.05); *A23K 20/158* (2016.05); *A23K 20/163* (2016.05); *A23K 50/40* (2016.05)

(58) Field of Classification Search
USPC ....................................................... 424/442
See application file for complete search history.

(56) References Cited

U.S. PATENT DOCUMENTS

| | | | | |
|---|---|---|---|---|
| 3,115,409 | A * | 12/1963 | Hallinan et al. | 426/641 |
| 6,410,063 | B1 * | 6/2002 | Jewell et al. | 426/2 |
| 2003/0194423 | A1 * | 10/2003 | Torney et al. | 424/442 |

FOREIGN PATENT DOCUMENTS

| | | | |
|---|---|---|---|
| EP | 000026985 | * | 4/1981 |
| WO | 0195739 A2 | | 12/2001 |
| WO | 2009099628 A2 | | 8/2009 |

OTHER PUBLICATIONS

Kienzle (J. Nutr. 121: S39-S40, 1991).*
Nelson (http://www.k-state.edu/media/newsreleases/sept09/petexercise90809.html; Sep. 8, 2009).*
Kronfeld DS et al: Hematological and Metabolic Responses to Training in Racing Sled Dogs Fed Diets Containing Medium, Low, or Zero Carbohydrate, the American Journal of Clinical Nutrition, American Society for Nutrition, US, vol. 30, No. 3, Mar. 1977, pp. 419-430, XP001053391.
Hamada K et al: Effect of amino acids and glucose on exercise-induced gut and skeletal muscle proteolysis in dogs, Metabolism, Clinical and Experimental, WB Saunders Co., Philadelphia, PA, US, vol. 48 No. 2, 1 Feb. 1999, pp. 161-166, XP004538255.
International Search Report and the Written Opinion of the International Searching Authority PCT/US2014/043396, dated Oct. 6, 2014.

* cited by examiner

*Primary Examiner* — Devang Thakor
(74) *Attorney, Agent, or Firm* — Ronald A. Burchett; Julie M. Lappin

(57) ABSTRACT

Compositions and methods are provided for improving canine exercise performance. The compositions are pre-exercise supplements that generally comprise (a) about 35% to about 60% protein or amino acids, comprising one or more structural proteins, one or more bioavailable proteins and one or more branched chain amino acids; (b) about 20% to about 38% fat, comprising at least one source of medium chain triglycerides; and (c) about 5% to about 25% carbohydrate. The methods involve administering the supplement to the animal within about 30-60 minutes before the beginning of the exercise session. The supplements can be administered in conjunction with one or more other exercise performance-enhancing or recovery agents.

12 Claims, No Drawings

COMPOSITIONS AND METHODS FOR ENHANCING EXERCISE PERFORMANCE

CROSS REFERENCE TO RELATED APPLICATIONS

This application claims priority to U.S. Provisional. Application Ser. No. 61/841,011 filed Jun. 28, 2013, the disclosure of which is incorporated in its entirety herein by this reference.

BACKGROUND OF THE INVENTION

Field of the Invention

The invention relates generally to field of exercise performance and nutrition in support thereof. In particular, the invention relates to dietary supplements containing proteins and fats that are readily absorbed, and methods for administering the supplements within a defined period prior to exercise.

Description of Related Art

Performance improvement for canines can be related to increased stamina or endurance while running, tracking, retrieving, swimming, pulling, or any other activity that requires sustained physical movement or exertion during a required task or activity. For dogs, fat metabolism is the primary route for generating energy during sub-maximal exertion. Dogs are inherently "programmed" (evolved) for high endurance activity and metabolism. However, depending on the level of exercise conditioning, physical fitness, and frequency of exercise, fatigue will occur. Hence, prolonging endurance and/or performance is of clear benefit, so having an performance enhancing food product or nutrient delivery system would be advantageous.

In dogs, fat oxidation provides most of the animal's energy at low rates of energy expenditure, whereas with humans, energy is more preferentially generated from glucose from glycogen stores. More specifically, for dogs, the amount of energy from fat oxidation at rest and during exercise is twice that in less aerobic species such as goats (McLelland et al., 1994, Am. J. Physiol. 266 (4 Pt. 2): R1280-1286; Weibel et al., 1996, J. Exp. Biol. 199 (8): 1699-1709). In humans, carbohydrate oxidation supports the intermediate speed of marathon runners until all glycogen stores have been depleted, whereupon fat oxidation becomes the only source available for energy (Hultman et al., 1994, in *Modern Nutrition in Health and Disease*, M. E. Shils, J. A. Olson, and M. Shike, eds; Lea & Febiger, Philadelphia, pp. 663-685). Consequently, stamina for humans is limited by the amount of glycogen in muscle, whereas in dogs, activation of fat metabolism and conversion of amino acids into glucose becomes initiated soon after exercise, thus contributing to an overall increased aerobic capacity and endurance.

Muscle fiber variation among different animals also contributes to the degree in which either aerobic or anaerobic sources of energy are used. In dogs and cats, muscles contain different muscle fiber types. Specifically, all fiber types in dogs have high aerobic capacity, thus are fatigue resistant. In contrast, the muscle fibers of cats can be divided into low aerobic type that relies on anaerobic metabolism, or a high aerobic type with high capacity for aerobic metabolism. Consequently, maximum oxygen metabolism capacity ($V_{O_2}$max) and blood flow at $V_{O_2}$max in leg (gastrocnemius) muscles have been determined to be about five times higher in dogs than cats. Thus, dogs are adapted for endurance exercise using fat as an energy source, whereas cats are adapted for short bursts of activity such as that required when jumping and pouncing on prey, thus using glycogen as the energy source.

Exercise performance for canines is also significantly related to protein and amino acid metabolism. Protein and amino acid synthesis and catabolism increase in exercising dogs. Synthesis increases to accommodate the changes associated with training and to replace protein and amino acids catabolized during exercise. Protein and amino acids are catabolized during exercise as a source of energy, particularly within exercising muscles, and as precursors of gluconeogenesis. Gluconeogenesis plays an important role in exercise, particularly in exercise lasting longer than 30 minutes, as gluconeogenic precursors like alanine, lactate, pyruvate and glutamine increase. Importantly, precursors for gluconeogenesis are mobilized from the muscle, gut, and adipose tissue. Glutamine and alanine are important gluconeogenic precursors because they shuttle the ammonia by-product resulting from branched-chain amino acid oxidation out of exercising muscles for conversion to glucose by the liver. Consequently, labile protein sources in the gut appear to be the source of branched-chain amino acids that support exercising muscles and are liberated as a result of exercise-induced muscle protein catabolism.

Physical performance can become altered as a result of cell stress and cellular damage to the muscle. Cellular damage is a natural consequence of exercise, and results from excessive protein catabolism, as well as oxidative stress occurring from free-radicals generated by aerobic respiration. The term "cellular damage" is well established within the sport/exercise research community. The degree to which this metabolic condition occurs is related to several factors, including conditioning, duration, intensity, and recurrence of exercise, as well as to nutrition, which can be used to alter this metabolic condition in a favorable manner.

Following exercise-induced muscle damage there is a reduction in the ability of the muscle to contract with maximal force (Pearce et al., 1998, J. Sci. Med. Sport 1: 236-244), which is observed in all three types of muscle action; eccentric (lowering of lifted weight or lengthening of muscle), concentric (lifting weight or shortening of muscle), and isometric (muscle length does not change during contraction) (Turner et al., 2008, J. Appl. Physiol. 105: 502-509), as well as jumping (Kirby et al., 2012, Amino Acids 42(5): 1987-1996).

The depletion of intracellular branched-chain amino acid levels in muscle cells during exercise results from their oxidation as an energy source. Intracellular depletion of branched-chain amino acids, particularly leucine, also corresponds to a reduction in circulating plasma concentrations. Doses of BCAAs (0.050 to 0.100 g/kg BW) ingested before endurance and resistance exercise reduced muscle damage biomarkers (i.e., CK), muscle soreness during recovery (DOMS: delayed onset of muscle soreness) and reduced muscle fatigue (Greer et al., 2007, Int. J. Sport Nutr. Exerc. Metab. 17(6): 595-607; Jackman et al., 2010, Med. Sci. sports Exerc. 42(5): 962-70).

Currently, there is no effective food for animals, particularly for dogs, that can be fed before exercise that can adequately prime their metabolism or minimize endogenous protein breakdown to enhance their endurance and/or reduce the natural catabolic state induced by exercise, and subsequently improve their performance during an exercise bout. Furthermore, reducing the extent of the exercise-induced catabolic state will hasten post-exercise recovery. For example, within the dog performance snack market, current products are formulated with high levels of carbohydrates and very little fat—likely below 6%. This would lead to an elevation in insulin secretion, which would result in a reduction in the activity of exercise-related metabolic pathways. Typically, these products also are low in protein (e.g., below 10%) and the protein sources they contain are not formulated for ready digestion.

SUMMARY OF THE INVENTION

It is, therefore, an object of the present invention to provide compositions and methods useful for enhancing exercise performance in an animal, particularly a canine.

It is another object of the present invention to provide compositions and methods useful for enhancing exercise performance in an animal, particularly a canine, by increasing the bioavailability of dietary protein in the animal.

It is another object of the present invention to provide compositions and methods useful for enhancing exercise performance in an animal, particularly a canine, by increasing the bioavailability of branched-chain amino acids in the animal.

It is another object of the present invention to provide compositions and methods useful for enhancing exercise performance in an animal, particularly a canine, by increasing the bioavailability of leucine in the animal It is another object of the present invention to provide compositions and methods useful for enhancing exercise performance in an animal, particularly a canine, by reducing the oxidation of endogenous sources of branched-chain amino acids in the animal.

It is another object of the present invention to provide compositions and methods useful for enhancing exercise performance in an animal, particularly a canine, by activating protein synthesis in the animal.

It is a further object of the invention to provide kits for improving exercise performance in the animal, and for use in the methods described herein.

It is another object of the invention to provide a package comprising a composition provided herein and a label, logo, graphic or the like affixed to the package indicating the contents of the package and/or the benefits of administering the dietary supplements to an animal for the purposes of improving exercise performance.

One or more of these and other objects are achieved using novel compositions and methods for enhancing exercise performance in animals. Generally, the compositions can comprise a pre-exercise supplement that includes (a) about 35% to about 60% protein or amino acids, comprising one or more structural proteins, one or more bioavailable proteins and one or more branched chain amino acids; (b) about 20% to about 38% fat, comprising at least one source of medium chain triglycerides; and (c) about 5% to about 25% carbohydrate. The methods comprise administering the supplement within a pre-determined period prior to the commencement of exercise.

These and other and further objects, features, and advantages of the present invention will be readily apparent to those skilled in the art.

DETAILED DESCRIPTION OF THE INVENTION

Definitions

The term "individual" when referring to an animal means an individual animal of any species or kind, most particularly a canine.

The term "animal" means any animal that could benefit from one or more of the compositions and methods of the provided herein, particularly an animal that could benefit from methods and compositions that are useful for enhancing exercise performance. Thus, the instant disclosure relates to any animal. In one embodiment, the animal can be a canine. In one aspect, the canine can be a domesticated species, such as a dog. For example, certain canine companions are subjected to physical activity that can be strenuous, particularly canines that are used for work, such as sledding or carting, herding, police work, rescue, tracking, sport and agility. Alternatively, the canine can be a semi-domesticated or undomesticated species, such as a dingo, wolf, coyote, jackal or fox.

As used herein "exercise" is a type of physical activity undertaken by an animal or caused to be undertaken by an animal for a particular purpose such as general heath, fitness, weight management, improving a particular aspect of health or fitness, strengthening, improving a physical skill or set of skills, improving a function, rehabilitating an injury, and the like. Exercise can be performed on a regular basis, for example daily, thrice per week, or once per week. Frequencies of exercise less than once per week are considered "occasional" exercise. Other patterns of exercise are also recognized and contemplated for use herein. The compositions and methods are useful with exercise whether regular or occasional.

The term "effective amount" means an amount of a compound, material, composition, medicament, or other material that is effective to achieve a particular biological result. Such results include, but are not limited to, one or more of the following outcomes set forth hereinbelow.

The term "supplement" or "dietary supplement" means a product that is intended to be ingested in addition to the normal animal diet. Dietary supplements may be in any form, e.g., solid, liquid, gel, tablets, capsules, powder, and the like. In one embodiment, they are provided in convenient dosage forms. In some embodiments they are provided in bulk consumer packages such as bulk powders, liquids, gels, or oils. In other embodiments, supplements are formulated as food items such as snacks, treats, biscuits, beverages and the like.

The terms "administering" or "administration" include self-administration in addition to administration to another animal, for example a caretaker may administer a dietary supplement to a companion animal.

The term "oral administration" or "orally administering" means that the animal ingests, or a human is directed to feed, or does feed, the animal one or more of the compositions described herein. Wherein a human is directed to feed the composition, such direction may be that which instructs and/or informs the human that use of the composition may and/or will provide the referenced benefit, for example, enhancing performance during physical activity or exercise. Such direction may be oral direction (e.g., through oral instruction from, for example, a physician, veterinarian, or other health professional, or radio or television media (i.e., advertisement), or written direction (e.g., through written direction from, for example, a physician, veterinarian, or other health professional (e.g., prescriptions), sales professional or organization (e.g., through, for example, marketing brochures, pamphlets, or other instructive paraphernalia), written media (e.g., internet, electronic mail, website, or other computer-related media), and/or packaging associated with the composition (e.g., a label present on a container holding the composition), or a combination thereof (e.g., label or package insert with directions to access a website for more information).

The term "in conjunction" means that a composition for improving exercise performance, a food composition, medicament, drug, recovery agent, or other compound or composition described herein are administered to an animal (1) together in a single composition or (2) separately at the same or different frequency using the same or different administration routes at about the same time or periodically. "Periodically" means that the agent is administered on a dosage schedule acceptable for a specific agent and that the food or supplement is fed to an animal routinely as appropriate for the particular animal. "About the same time" generally means that the supplement and agent are administered at the same time or within about 72 hours of each other. "In conjunction" specifically includes administration schemes wherein a dietary supplement as disclosed herein is administered within a defined window of time before exercise, the window being between about 0-120 minutes before the start of the exercise.

The term "single package" means that the components of a kit are physically associated, in or with one or more containers, and considered a unit for manufacture, distribution, sale, or use. Containers include, but are not limited to, bags, boxes or cartons, bottles, packages of any type or design or material, over-wrap, shrink-wrap, affixed components (e.g., stapled, adhered, or the like), or combinations of any of the foregoing. For example, a single package kit may provide containers of individual compositions and/or food compositions physically associated such that they are considered a unit for manufacture, distribution, sale, or use.

The term "virtual package" means that the components of a kit are associated by directions on one or more physical or virtual kit components instructing the user how to obtain the other components, e.g., in a bag or other container containing one component and directions instructing the user to go to a website, contact a recorded message or a fax-back service, view a visual message, or contact a caregiver or instructor to obtain, for example, instructions on how to use the kit, or safety or technical information about one or more components of a kit. Examples of information that can be provided as part of a virtual kit include instructions for use; safety information such as material safety data sheets; poison control information; information on potential adverse reactions; clinical study results; dietary information such as food composition or caloric composition; general information on physical activity, exercise, metabolism, endurance and the like.

All percentages expressed herein are by weight of the composition on a dry matter basis unless specifically stated otherwise. The skilled artisan will appreciate that the term "dry matter basis" means that an ingredient's concentration or percentage in a composition is measured or determined after any free moisture in the composition has been removed.

Ranges are used herein in shorthand, so as to avoid having to set out at length and describe each and every value within the range. Any appropriate value within the range can be selected, where appropriate, as the upper value, lower value, or the terminus of the range.

Where used herein, the term "about" indicates that the given value, plus or minus 20% or 15% or 10% or 5% or 1%, is intended. "About" is thus used a shorthand to reflect the recognition that small variations from the literal value stated are still within the scope of the invention.

As used herein and in the appended claims, the singular form of a word includes the plural, and vice versa, unless the context clearly dictates otherwise. Thus, the references "a", "an", and "the" are generally inclusive of the plurals of the respective terms. For example, reference to "a dog", "a method", or "a supplement" includes a plurality of such "dogs", "methods", or "supplements". Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Where used herein "examples," or "for example," particularly when followed by a listing of terms, is merely exemplary and illustrative, and should not be deemed to be exclusive or comprehensive.

The term "comprising" is intended to include embodiments encompassed by the terms "consisting essentially of" and "consisting of". Similarly, the term "consisting essentially of" is intended to include embodiments encompassed by the term "consisting of".

The methods and compositions and other advances disclosed here are not limited to particular methodology, protocols, and reagents described herein because they may be varied in ways that are apparent the skilled artisan. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, certain compositions, methods, articles of manufacture, or other means or materials are described herein.

All patents, patent applications, publications, technical and/or scholarly articles, and other references cited or referred to herein are in their entirety incorporated herein by reference to the extent allowed by applicable law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved. Full citations for publications not cited fully within the specification are set forth at the end of the specification.

The Invention

The present inventors have recognized that most formulated energy products for dogs include a variety of vitamin/mineral and carbohydrate formulations touted to promote performance, but none target the underlying physiology of enhancing protein building or reducing protein breakdown for exercise. In addition, specific feeding times for foods/supplements before exercise have not been understood as impacting performance. Accordingly, the present inventors have discovered new compositions and methods that influence and improve exercise performance in an animal, particularly a canine.

One aspect of the invention features a pre-exercise dietary supplement for an animal. In certain embodiments, the animal is one whose metabolism uses fat as a first and/or primary energy source in endurance exercise. In one embodiment, the animal is a canine.

The supplement can comprise: (a) about 35% to about 60% protein, peptides and/or amino acids, comprising one or more structural proteins, one or more bioavailable proteins and one or more branched chain amino acids; (b) about 20% to about 38% fat, comprising at least one source of medium chain triglycerides; and (c) about 5% to about 25% carbohydrate, in one aspect, comprising complex carbohydrates.

In certain embodiments, the supplement comprises at least about 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58% or 59% protein, peptides and/or amino acids. In certain embodiments, the supplement comprises up to about 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59% or 60% protein, peptides and/or amino acids. In particular, the supplement can comprise between about 40% and about 50% protein, peptides and/or amino acids, or between about 45% and about 55% protein, peptides and/or amino acids. In one embodiment, the protein/peptide/amino acid component of the supplement will include about 30-46% structural protein, about 24-31% medium length peptide fragments, and about 20-50% bioavailable proteins/peptides. Distributed within the protein/peptide/amino acid component are about 6-8% branched chain amino acids (the latter percentage based on the total product).

As mentioned, the protein/peptide/amino acid components of the supplement include structural protein, bioavailable proteins or peptides, and amino acids. The structural protein functions to provide shape, texture and nutritional content to the supplement. Structural proteins can include animal proteins such as muscle and organ protein. In one embodiment, the structural protein includes heart muscle, such as beef heart, and may also include a vegetable protein such as soy meal, flour or grits.

The bioavailable protein or peptide component functions to provide a rapidly absorbed protein source at the outset of the exercise period. Such rapidly absorbed protein sources can include those that are absorbed within 30 minutes upon ingestion, and in one aspect, within 15 minutes. Bioavailable proteins/peptides can include whey, partially hydrolyzed soy protein, hydrolyzed amino acids, or any combination thereof. The whey protein, if present, comprises a whey protein concentrate with about 80% crude protein; the soy, if present is in the form of Soy Protein Modified (e.g., SPI 1510, a partially hydrolyzed product) or soy protein isolate (not hydrolyzed).

The branched chain amino acids (BCAA) function to stimulate protein synthesis, reduce protein catabolism, activate muscle protein rebuilding, reduce muscle fatigue, reduce muscle damage and the accumulation of biomarkers associated with muscle cell damage or stress. In one embodiment, the branched chain amino acid is leucine. In certain embodiments, leucine, either as a separate amino acid or as part of a protein, is present in an amount between about 2% and about 5% of the dietary supplement. In certain embodiments, the supplement contains at least about 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8% or 4.9% total leucine. In certain embodiments, the supplement contains up to about 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9% or 5% total leucine. In particular embodiments, the supplement contains between about 2.5% and about 5% total leucine, or between about 3.5% and about 5% total leucine, or between about 3.5 and about 4.5% or between about 3.6% and about 4.4% total leucine. In certain embodiments, the supplement contains at least about 0.8%, 0.85%, 0.9%, 0.95%, 1.0% 1.05%, 1.1%, 1.15%, 1.2% or 1.25% free leucine. In certain embodiments, the supplement contains up to about 0.85%, 0.9%, 0.95%, 1.0% 1.05%, 1.1%, 1.15%, 1.2% 1.25% or 1.3% free leucine. In particular embodiments, the supplement contains between about 0.8% and 1.4% free leucine, or between about 0.9% and 1.3% free leucine.

In various embodiments, the composition further comprises one or more additional amino acids or their salts or derivatives, for example, glutamine, glutamic acid, one or more other BCAA (isoleucine, or valine), or arginine. Each of these amino acids is considered to play a role in improving performance or influencing recovery from strenuous activity, for example by shifting from protein catabolism to protein biosynthesis, by having a sparing effect on loss of an amino acid or protein such as muscle protein, and/or by providing one or more intermediates for energetic or biosynthetic purposes, such as tricarboxylic acid (TCA) cycle intermediates.

In certain embodiments, the supplement comprises at least about 20%, 21%, 22%, 23%, 24%, 25%, 26%, 27%, 28%, 29%, 30%, 31%, 32%, 33%, 34%, 35%, 36% or 37% fat. In certain embodiments, the supplement comprises up to about 21%, 22%, 23%, 24%, 25%, 26%, 27%, 28%, 29%, 30%, 31%, 32%, 33%, 34%, 35%, 36%, 37% or 38% fat. In particular, the supplement can comprise between about 24% and about 34% fat, or between about 26% and about 32% fat, or between about 28% and about 30% fat.

The fat component of the dietary supplement typically comprises a combination of fats, at least one of which is a source of medium chain triglycerides. In one embodiment, the source of medium chain triglycerides is coconut oil, palm kernel oil, or a combination of those oils and other MCT-containing plant oils. In another embodiment, commercially available blends of medium chain triglycerides are utilized, e.g., NEOBEE® MCTs (Stepan Lipid Nutrition, Maywood, N.J.), among many others. In one embodiment, the composition comprises about 15% to about 30% medium chain triglycerides as a percent of total fat. In one embodiment, the composition comprises about 2.6% to about 7.6% medium chain triglycerides as a percent of the total nutritional content of the supplement. The remainder of the fat component can come from the protein source, e.g., the meat component if present. Additionally or alternatively, fat sources, such as lard, poultry fat, vegetable oil, fish oil and the like, can be added.

The carbohydrate content should be kept low, and should comprise mostly complex carbohydrates such flour, meal or starch. In certain embodiments, the supplement comprises up to 6%, 7%, 8%, 9%, 10%, 11%, 12%, 13%, 14%, 15%, 16%, 17%, 18%, 19%, 20%, 21%, 22%, 23%, 24% or 25% carbohydrate; however, some embodiments keep the carbohydrate content low, for instance, less than 20%, or less than 15%, or less than 10%, or less than 7%, of the total nutritional content of the supplement. By keeping the carbohydrate content comparatively low and/or by using complex carbohydrates, insulin secretion can be minimized.

It should be kept in mind that the nutritional supplement is intended to provide only a portion of the animal's total daily nutritional needs, in particular, an amount of nutrients (i.e., combination of proteins, peptides, amino acids, fats, carbohydrates, micronutrients) sufficient to enhance exercise performance but not enough to cause the animal to feel full or sluggish. Accordingly, the supplement can be formulated to provide the animal with nutrients in amounts between about 1.0 g/kg body weight (BW) and about 3.0 g/kg BW of the animal. In certain embodiments, the supplement is formulated to provide the animal with nutrients in amounts of at least about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8 or 2.9 g/kg BW of the animal. In certain embodiments, the supplement is formulated to provide the animal with nutrients in amounts up to about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or 3.0 g/kg BW of the animal. In one embodiment, the supplement is formulated to provide the animal with nutrients in amounts between about 1.2 and about 2.2 g/kg BW of the animal. In another embodiment, the supplement is formulated to provide the animal with nutrients in amounts between about 1.4 and about 2.0 g/kg BW of the animal. In a particular embodiment, the supplement is formulated to provide the animal with nutrients in amounts between about 1.6 and about 1.8 g/kg BW of the animal.

The composition can be adapted for use in any form typical for dietary supplements for animals. In one embodiment, the supplement is formulated as pet food, such as in a pet treat form, such as a biscuit or chew. In other embodiments, the nutrient content described above can be provided in the form of a gel, paste, jelly or beverage. Accordingly, the moisture or water content, or content of inert carriers can vary, as would be appreciated by the skilled artisan.

The composition may further comprise one or more other agents to improve exercise performance, enhance metabolism, extend endurance and/or influence recovery from exercise. Performance enhancing agents and/or recovery agents include antioxidants such as vitamin C, vitamin E; or vitamin A, compounds such as succinate or its salts or derivatives, various enzyme co-factors (e.g. coenzyme Q10), electrolytes such as sodium, potassium, herbal supplements or extracts, and the like. In some embodiments, the compositions described herein may also be administered or taken at about the same time as, or in conjunction with, such additional agents, or they can be formulated together in a single composition, or in a single kit containing several compositions. Among other things, such additional agents can also aid with the hydration or rehydration of the animal, as well as the oxygenation or reoxygenation of the animal's blood.

Another aspect of the invention features a method for improving exercise performance in an animal, particularly a canine. The method comprises administering to the animal a pre-exercise supplement comprising (a) about 35% to about 60% protein and/or amino acids, comprising one or more structural proteins, one or more bioavailable proteins and one or more branched chain amino acids; (b) about 20% to about 38% fat, comprising at least one source of medium chain triglycerides; and (c) about 5% to about 25% carbohydrate, in one aspect, comprising complex carbohydrates.

In one embodiment, the supplement is administered prior to exercise, for instance, between about zero and about 5, 10, 15, 20, 25, 30, 35, 40, 45, 50, 55 or 60 minutes prior to exercise. In one embodiment, the supplement is administered about 10 minutes to about 20 minutes, or between about 20 minutes to about 40 minutes, or between about 40 minutes to about 60 minutes prior to exercise. In a particular embodiment, the supplement is administered about 30 minutes prior to exercise. For extended exercise, the supplement can be administered periodically during exercise. For instance, additional supplement could be provided after 30, 60, 90 or more minutes of continuous exercise.

The method provides for administration of an effective amount of the composition for improving exercise performance. The effective amount required is an amount sufficient to accomplish one or more of the following effects: (1) increased BCAA in the blood within about 30 minutes following administration, (2) increased leucine in the blood within about 30 minutes following administration; (3) increased availability of free fatty acids, and/or glycerol for exercising muscles, for instance, as measured by increase in blood circulating levels of those substances; (4) substantial avoidance of insulin secretion following administration (e.g. less than 5%); (5) reduction of activity-induced protein catabolism; (6) increased protein biosynthesis (7) stable or increased blood oxygenation, (8) reduced production of at least one stress hormone; (9) reduced production of protein oxidation products, (10) increased or reduced-depletion of endogenous pH buffering agents like beta-alanine and/or carnosine levels to off-set exercise-induced lactic acid production, and/or (11) reduced fatigue or reduced soreness. Such levels can be measured by comparing levels with and without use of the present compositions before exercise as described herein.

The method can be used in any animal or group of animals that participates in physical activity, particularly those that are subjected to strenuous activity such as working, training, competitive sports and the like. In particular, the animals are canines, such as working dogs, competing dogs, or dogs that accompany their human caretakers on, for example, walking, jogging, hiking, or running.

The methods of the invention for improving exercise performance by administering the dietary supplement described herein can also involve administration of additional agents for improving exercise performance or another ancillary beneficial objective, such as enhancing recovery from strenuous exercise or minimizing stress-related consequences of exercise, as described above. The administration of the dietary supplement for improving exercise performance can precede, or be simultaneous or sequential with, or can follow the administration of the other agents. For example, the pre-exercise supplement and one or more recovery agents may be taken before the start of, during, or after the completion of the physical activity.

Another aspect of the invention features kits for improving exercise performance, and kits for preparing a dietary supplement as described herein. The kits for improving exercise performance comprise, in separate containers in a single package or in separate containers in a virtual package: (1) a pre-exercise supplement comprising (a) about 35% to about 60% protein and/or amino acids, comprising one or more structural proteins, one or more bioavailable proteins and one or more branched chain amino acids; (b) about 20% to about 38% fat, comprising at least one source of medium chain triglycerides; and (c) about 5% to about 25% carbohydrate, in one aspect, comprising complex carbohydrates; and (2) instructions for using the supplement for improving exercise performance in an animal that is about to undertake such activity.

The kits further or optionally comprise one or more recovery agents, additional compositions, or medicaments for improving exercise performance, and/or for influencing recovery from strenuous physical activity or for treating or mitigating damage resultant from strenuous physical activity in animal. The kits also optionally or further comprise additional instructions for using the performing-enhancing or recovery-aiding agents, additional compositions, or medicaments in conjunction with the pre-exercise supplement.

The kits further or optionally comprise instructions for one or more of using the kit for preparing the supplement or administering the supplement to an animal. A vessel, bowl or container, or the like can be provided in the kits for admixing the package contents to prepare the supplement. For example a simple disposable, flexible mixing bag with a reclosable or zip-type fastener may be very useful for admixing the components. Alternatively, the kit may include instructions for admixing the components as they are consumed such that the supplement is formed in the animal at the time of administration.

Still other aspects provided herein include means for communicating information about, or instruction for use of, a dietary supplement useful for improving exercise performance in an animal. The information is communicated particularly about pre-exercise dietary supplements comprising (a) about 35% to about 60% protein and/or amino acids, comprising one or more structural proteins, one or more bioavailable proteins and one or more branched chain amino acids; (b) about 20% to about 38% fat, comprising at least one source of medium chain triglycerides; and (c) about 5% to about 25% carbohydrate. The information communicated by the described means is about, or the instructions are for, one or more of:

(1) instructions for administering the supplement to an animal before exercise,
(2) information on providing proper nutrition, including the supplement, to an animal that exercises or that will be exercising,
(3) information about exercise, including physical activity or strenuous physical activity,
(4) information regarding physical, cellular or biochemical results of exercise, or nutrients required during exercise, or the uptake of nutrients prior to exercise, or
(5) comparative information or test results regarding the supplement.

The communication means typically comprises a physical or electronic document, digital storage media, optical storage media, audio presentation, audiovisual display, or visual display containing the information or instructions. In various embodiments, the communication means is selected from the group consisting of a displayed web site, visual display kiosk, brochure, product label, package insert, advertisement, handout, public announcement, audiotape, videotape, DVD, CD-ROM, computer readable chip, computer readable card, computer readable disk, USB device, FireWire device, computer memory, and any combination thereof.

Also provided herein is a package comprising a composition of the invention and a label, logo, graphic, symbol, slogan, or the like identifying the package and composition within as useful for improving exercise performance in an animal. In one embodiment, the package comprises a pre-exercise dietary supplement having (a) about 35% to about 60% protein and/or amino acids, comprising one or more structural proteins, one or more bioavailable proteins and one or more branched chain amino acids; (b) about 20% to about 38% fat, comprising at least one source of medium chain triglycerides; and (c) about 5% to about 25% carbohydrate. The package further contains a word or words, picture, design, logo, graphic, symbol, acronym, slogan, phrase, or other device, or combination thereof, either directly on the package or on a label affixed thereto, indicating that the contents of the package are useful for improving exercise performance in an animal. In some embodiments, the package can comprise the words "improves exercise performance", "extends endurance", "stimulates metabolism", or an equivalent expression printed on the package. Any package or packaging material suitable for containing the composition is useful in the invention, e.g., a bag, box, bottle, can, pouch, and the like manufactured from paper, plastic, foil, metal, and the like.

In another aspect, the invention provides for use of one or more composition provided hereinabove to prepare a medicament for improving exercise performance in an animal, particularly a canine. The medicament can further comprise one or more performance enhancing or exercise recovery agents, vitamins, electrolytes, antioxidants, herbal extracts, NSAIDs, analgesics or pain medication, or combinations thereof. Generally, medicaments are prepared by admixing a compound or composition with excipients, buffers, binders, plasticizers, colorants, diluents, compressing agents, lubricants, flavorants, moistening agents, and other ingredients known to skilled artisans to be useful for producing medicaments and formulating medicaments that are suitable for administration to an animal.

The invention can be further illustrated by the following example, although it will be understood that this example is included merely for purposes of illustration and is not intended to limit the scope of the invention unless otherwise specifically indicated.

Example 1

Feeding studies with a pre-exercise food were conducted to establish efficacy and to determine the feeding dose and timing recommendation prior to exercise. The objectives of the studies were: (1) to determine an effective feeding dose of a pre-exercise snack by assessing the appearance of key nutrients and metabolites of dietary constituents in the blood of dogs after feeding; and (2) to determine an effective feeding time prior to exercise using the feeding dose selected in Objective 1.

Methodology

A feeding trial was performed using adult dogs to assess the bioavailability of the amino acid leucine and total branched-chain amino acids after ingesting the test food.

A timing trial with no exercise was conducted—all dogs (body weight (BW) mean: 22 kg+/−2.7 kg) were fasted overnight, but had free access to water. Three treatment groups were utilized, each consisting of 15 dogs. Two test groups were fed 1.6 g of food/kg BW of either Chicken and rice dry extruded kibble formulated to contain at least 30% crude protein and at least 20% crude fat representative of a canine performance food (Nestlé Purina, St. Louis Mo.) or test food at approximately 9 am. A third control group was included to represent not feeding anything prior to exercise (fasted). Blood samples were collected before feeding and at various times after feeding (0, 30, and 60-min post ingestion).

Test Diets:
Control Food—Chicken and rice dry extruded kibble formulated to contain at least 30% crude protein and at least 20% crude fat representative of a canine performance food. Targeted to contain 31% crude protein on as fed basis.
Test Food—formulated to contain 44% crude protein on as-fed basis.

Table 1 below summarizes the formula ingredients and percentages of the test formula used in the feeding trial.

TABLE 1

| test food ingredients | Test formula |
| --- | --- |
| Beef Hearts | 60.5 |
| L-leucine | 0.9 |
| Soy Grits 80-0 | 5.0 |
| Coconut Oil | 7.2 |
| Soy Protein Modified (SPI 1510) | 5.5 |
| Whey Protein Concentrate | 6.0 |
| Glycerine | 5.0 |
| GDL NE | 1.2 |
| Flavor Smoke P-50 | 0.3 |
| Calcium Propionate | 0.12 |
| Salt | 1.5 |
| Phosphoric Acid | 0.5 |
| Caramel Coloring | 0.75 |
| Garlic Powder | 0.5 |
| Soy Protein Isolate | 2.0 |
| TG Gelatin | 1.5 |
| Soy Lecithin | 2.0 |
| Sorbic Acid | 0.28 |
| PMX Naturox Plus | 0.1 |
| Vitamin mix | 0.125 |

Trial Results

Test Foods and Protein Ingestion:

The mean food ingestion amounts are listed below for each treatment group.

As fed basis Dry matter basis L-Leu ingested basis

Control food—1.6 g/kg BW 1.5 g/kg BW 56.8 mg/kg BW

Test formula 1.6 g/kg BW 1.2 g/kg BW 56.6 mg/kg BW

The mean crude protein (on dry matter basis) ingestion amounts are listed below for each treatment group.

Dry Matter Basis

Control food—0.49 g/kg BW

Test food 0.53 g/kg BW

Effect of Test Food on L-Leucine Bioavailability:

The trial evaluated the postprandial appearance of amino acids in dog serum after ingesting 1.6 g of food/kg BW (Test Food or Control Food) or without food. Results are shown in Table 2 below.

TABLE 2

Mean (+/−SEM) serum L-leucine concentration for treatment groups.

| | Treatment Groups | | | |
| --- | --- | --- | --- | --- |
| Time after feeding (minutes) | Control - No feeding group Fasted | Control - feeding group Control Food | Test - feeding group Prototype Food | ANOVA P-value |
| serum leucine concentration (nmol/mL) | | | | |
| 0 | 178.1 +/− 7.4 | 172.6 +/− 9.6 | 188.5 +/− 8.3 | NS[1] |
| 30 | 163.9 +/− 7.4 | 170.9 +/− 7.5 | 191.7 +/− 7.2 | <0.05 |
| 60 | 166.3 +/− 7.3 | 201.7 +/− 11.3 | 197.5 +/− 8.0 | <0.05 |
| serum branched-chain amino acid concentration (nmol/mL) | | | | |
| 0 | 479 +/− 15 | 480 +/− 26 | 499 +/− 16 | NS[1] |
| 30 | 452 +/− 18 | 479 +/− 22 | 499 +/− 11 | NS[1] |
| 60 | 461 +/− 17 | 528 +/− 27 | 507 +/− 18 | NS[1] |

[1]NS: not statistically significant

The data specifically demonstrate that the test food formula is superior in its ability to significantly enhance the delivery of L-Leu (ANOVA P<0.05), as indicated by the 12.2% increase serum appearance of the amino acid at 30 min after ingestion compared to a similar amount of a main-meal performance formula (Control Food). Both test foods fed at 1.6 g of food per kg BW actually deliver the same amount of dietary L-leucine to the animal, but the test formula is uniquely capable of enhancing L-leucine bioavailability to the animal at 30 min after ingestion.

In addition, the data specifically demonstrate that the test food formula is superior in its ability to quantitatively enhance the delivery of total branched-chain amino acids, as indicated by the 4% increase serum appearance of the amino acid at 30 min after ingestion compared to a similar amount of a main-meal performance formula (Control Food).

Summarized Benefits from Trials

The studies above can be summarized as follows:

Effective dose is approximately 1.6 g to 1.8 g of test food per kg of body weight. This equates to approximately a 36-40 gram bar for a 50 lb dog.

Effective feeding time is approximately 30 minutes prior to exercise.

Example 2

A feeding trial was conducted using an experimental design and control and test formulas similar to those described in Example 1, except dogs were exercised in this trial.

The trial evaluated the postprandial appearance of amino acids in dog serum after ingesting 1.6 g of food/kg BW (Test Food Formula or Control Food) or without food. Feeding of the test or control food occurred 60 minutes before exercise. Exercise at a 5-6 mph pace was maintained for 90 minutes. The data below were obtained from blood collected 30 min before exercise, immediate before exercise, and 60 minutes after start of exercise.

The data specifically demonstrate that serum leucine concentrations are significantly lower in dogs that do not receive a pre-exercise food. Either the test food or control food formula results in preventing the exercise-induced decrease in blood leucine concentration after 60 min of exercise. Both the control food and the test food were fed at 1.6 g of food per kg BW. However, the test food only contained 2.72% leucine, whereas the control food contained 3.57% leucine. Even so, the feeding resulted in similar levels of blood leucine before and during exercise. (Table 3).

Protein content of test formula: 36.4% on As fed basis, 44.66% on dry matter basis Protein content of control formula: 30.7% on As fed basis, 33.04% on dry matter basis

TABLE 3

Mean (+/−SEM) serum L-leucine and BCAA concentrations for treatment groups

| | Treatment Groups | | | |
| --- | --- | --- | --- | --- |
| Time relative to exercise (minutes) | Control - No feeding group Fasted | Control - feeding group Control Food | Test - feeding group Prototype Food | ANOVA P-value |
| serum leucine concentration (nmol/mL) | | | | |
| −30 | 154.7 +/− 8.0 | 159.2 +/− 9.3 | 161.6 +/− 5.5 | NS[1] |
| 0 | 152.5 +/− 7.7 | 167.0 +/− 6.3 | 167.0 +/− 5.6 | NS[1] |
| 60 | 131.6 +/− 6.2 | 156.4 +/− 7.4 | 150.8 +/− 5.6 | <0.05 |
| serum branched-chain | | | | |

TABLE 3-continued

Mean (+/−SEM) serum L-leucine and BCAA concentrations for treatment groups

| | Treatment Groups | | | |
|---|---|---|---|---|
| Time relative to exercise (minutes) | Control - No feeding group Fasted | Control - feeding group Control Food | Test - feeding group Prototype Food | ANOVA P-value |
| amino acid concentration (nmol/mL) | | | | |
| 0 | 466 +/− 16 | 479 +/− 20 | 484 +/− 14 | NS[1] |
| 30 | 465 +/− 20 | 502 +/− 16 | 504 +/− 16 | NS[1] |
| 60 | 426 +/− 18 | 472 +/− 18 | 479 +/− 17 | 0.08 |

[1]NS: not statistically significant

Example 2

An exercise trial was performed using adult dogs to assess the ingestion of a protein-fat-rich nutritional supplement prior to exercise in accordance with one embodiment of the present disclosure. Specifically, data contained in this document was based on a formula containing approximately 4.3% total L-leucine (as fed basis; 5.5% on DM basis) compared to 3.6% total L-leucine (as fed basis; 4.6% on DM basis) contained in previously examined formulas. Consequently, the ingested dose amount of L-leucine increases from 57 mg/kg BW to 68 mg/kg BW. By contrast, total protein content was 1.5% lower on DM basis compared to previously examined formula (data summarized below).

The present example generates data related to delivery of key nutrients before and during exercise when feeding a pre-exercise food before exercise and generates additional exercise related data to support metabolic and physiological benefits related to improving exercise performance and/or metabolism during exercise.

Summarized Benefits from Trials
The studies above can be summarized as follows:
composition reduces protein breakdown and amino acid oxidation,
composition reduces muscle cell disruption and cell stress,
composition reduces liver cell disruption and cell stress,
composition reduces protein oxidation by reactive nitrogen species,
composition to improve muscle cell buffering capacity and/or serum carnosine concentrations,
composition to improve beta-alanine concentrations to help promote endogenous carnosine synthesis, and
composition to improve serum osmolyte concentrations and/or serum taurine concentrations.

Methodology
Animals and Treatments:
Exercise trial was conducted using Husky x Pointer cross-bred dogs (N=38; 2 to 9 yrs old; mean 4.7 yrs+/−2.2 SD; BW mean: 23.7 kg+/−3.3 SD). Dogs were selected to participate in the trial and allocated evenly into 3 treatment groups to account for age, BW, and exercise ability.

All dogs were exercise-conditioned for 3 weeks prior to the treatment phase. Conditioning consisted of using an exercise wheel at 7-8 mph 2 or 3 times a week, for 3 weeks. Duration of exercise was gradually increased over the 3 week conditioning period to ensure all dogs could run for the 2-hr duration of the exercise during the treatment phase.

Experimental treatments consisted of a control group (N=13) that did not any receive pre-exercise food and 2 test-food groups that received a dry kibble food similar to a main meal chicken and rice formula (1.6 g per kg BW; N=13) or a test formula (ProPlan Prime bar; 1.6 g per kg BW; N=13) at 30 minutes prior to the start of exercise. All dogs were regularly fed once-daily and had free access to water.

Ambient environmental temperature during exercise ranged from 50 to 65° F.

Exercise Treatment Phase:
The treatment phase included a 2-hr exercise bout on days 1, 4, 7, 10, 13, 17, 18, and 19. Effects of a single day of exercise (1-d) were evaluated by collecting blood samples on day 7. Effects of 3 consecutive days of exercise were evaluated by collecting blood samples on day 19 (3-d). With one exception, all exercise bouts were performed using the exercise wheel for 2 hours at 7-8 mph. The one exception was on day 18 during the 3-day exercise test, in which dogs were exercised for 25 min at 13 mph while running as a group in harness. All dogs were divided into 4 exercise groups of 9 or 10 dogs per group, in which all 3 treatments were represented in each exercise group. On blood sampling days (day 7 and 19), dogs were temporarily stopped after the initial 60 min of exercise to obtain a blood sample and then run in the reverse direction for remainder of the exercise.

Four blood samples were collected on day 7 and day 19; 1.) immediately before ingesting the pre-exercise treatment food (30 min prior to exercise), 2.) 30 min after ingesting pre-exercise food (immediately before onset of exercise), 3.) after 60 min of exercise, and 4.) after 120 min of exercise (end of exercise).

Test Diets:
The diets are outlined as follows:
Control Food—representative of a commercial main meal food containing Chicken and Rice. Targeted to contain:
31-33.5% crude protein on as fed basis (33.7% on DM basis)
28-35% carbohydrates on as fed basis (34.4% on DM basis)
20-23% crude fat on as fed basis (23.3% on DM basis)
Test Food—formulated to contain:
32% crude protein on as fed basis (42% on DM basis)
23-25% crude fat on as fed basis (30-32% on DM basis)
Test Foods and Protein Ingestion:
The mean food ingestion amounts are listed below for each treatment group.

| | As fed basis | Dry matter basis |
|---|---|---|
| Control food | 1.6 g/kg BW | 1.5 g/kg BW |
| Test formula | 1.6 g/kg BW | 1.2 g/kg BW |

The mean crude protein ingestion amount per body weight listed below for each treatment group.
Control food −0.49 g/kg BW
Test formula −0.51 g/kg BW
The mean L-leucine (on as fed and dry matter basis) ingestion amounts are listed below for each treatment group.
Control food −56.8 mg/kg BW
Test formula −68.0 mg/kg BW
Trial Results
The trial evaluated the appearance of 3-methylhistidine (3MH) and creatine kinase in dog serum as biomarkers of muscle protein breakdown and exercise-induced muscle cell disruption, respectively. The appearance of asparagine aminotransferase (AST) is generally a biomarker originating from the muscle and liver, and related to cellular disruption and damage (Banfi et al., 2012). Exercise naturally results in a greater oxidative load, which in-part, causes cell membrane disruption and leakage (cell stress), which is demonstrated by observing increases in various muscle-specific enzymes, metabolites, and/or electrolytes in blood; some of which have become hallmark indicators of exercise-induced muscle-fiber damage and disruption of membrane integrity, such as lactate dehydrogenase (LDH) and creatine kinase (CK; Banfi et al., 2012). Dogs performing prolonged endurance-related exercise (Strasser et al., 1997; Davenport et al., 2001; Wakshlag et al. 2004; McKenzie et al., 2007), short duration (less than 2 min) sprinting (Lassen et al., 1986; Snow et al., 1988; Rose et al., 1989; Ilkiw et al., 1989; Rovira et al., 2007), or repetitive retrieving (duration approximately 10 min; Matwichuk et al., 1999; Steiss et al., 2004; Steiss et al., 2008) experience exercise related changes in various hematological analytes. These exercise-induced changes are largely reported as being within clinically "normal" ranges, yet many are statistically different from resting levels and may be associated with increased oxidative stress. Consequently, monitoring these blood markers provides a basis for assessing how dietary interventions may offset natural metabolic and physiological stresses associated with exercise.

Protein Catabolism:

The data demonstrates that the test food formula compared to a control formula is superior in its ability to reduce protein catabolism, as indicated by maintaining lower serum concentrations of 3MH before the start of exercise by 10% and by 7-10% during a single day of exercise (Table 4). The test food formula also reduces protein catabolism by 5% compared to fasted dogs before the onset of exercise. Feeding the control food as a pre-exercise supplement appears to increase protein catabolism during exercise, as compared to dogs fed the test food and fasted control dogs.

In addition, after continued exercise conditioning with or without pre-exercise supplementation for 3 weeks, which was followed by a 3-d exercise challenge, 3MH serum concentrations on d-3 in dogs fed the test food were 9% lower before exercise and maintained 12% lower after 60 min of exercise compared to dogs fed the control food. The test food formula provides an even greater reduction of protein catabolism compared to fasted dogs, as 3MH was about 15% lower before the onset of exercise and remained at least 7% lower during exercise Muscle Cell Disruption/Muscle Damage Marker:

The test food formula compared to a control formula is superior in its ability to support reduced muscle damage during exercise, as indicated by a lower serum concentrations of CK before the start of the 1-d exercise (26%) and by 29% during a single 2-hour bout of exercise (Table 4). Feeding the control food as a pre-exercise supplement appears to result in CK concentrations to be slightly elevated before starting exercise, and is higher than fasted dogs during and after exercise, as compared to fasted control dogs.

After continued exercise conditioning for 3 weeks with or without pre-exercise supplementation, which was followed by a 3-d exercise challenge, CK concentrations in serum on d-3 were relatively similar before exercise, but after 2 hrs of exercise ingestion of either treatment food resulted in a reduced CK concentrations by about 40% compared to dogs fasted prior to exercise.

AST serum concentrations were 8-15% lower at all sample time points before and during a single day exercise in dogs fed the test food formula compared to either the fasted dogs or the dogs fed the control food. On d-3 of the 3-d exercise challenge, AST concentrations followed a similar response to CK concentrations, in which dog fed either treatment group had 32% lower AST concentrations at the end of the 2-hr exercise.

Amino Acid Oxidation and Ureagenesis:

Amino acids derived from the digestion of dietary protein contribute to a highly active intracellular pool of amino acids, which that cannot be expanded. Excess amino acids from dietary protein and/or endogenous protein breakdown increase this amino acid pool. Consequently the excess amino acids follow 3 different paths; 1. new protein synthesis, 2. oxidation for energy that yields urea synthesis for disposal of nitrogen (ureagensis), and/or 3. Conversion to other compounds (reviewed by Schutz, 2011). A relationship exists in which the higher the dietary protein, thus excess amino acids being oxidized, the higher the urea production.

Serum urea concentrations on the 1-d exercise challenge were similar before exercise, but became elevated by 60-min of exercise in the dogs fed either of the pre-exercise supplement bars compared to the fasted control dogs. Dogs fed the control food had 10% higher urea concentration at the end of the 2-hr exercise compared to fasted control dogs, whereas dogs fed the test food were elevated by only 6%. This indicates that the protein in the control food was more oxidized during exercise, which is consistent with the observed elevation in 3 mH in the dogs fed the control food, thus less impactful to reduce protein catabolism compared to the test food.

After continued exercise conditioning for 3 weeks with or without pre-exercise supplementation, which was followed by a 3-d exercise challenge, mean urea concentrations in serum on d-3 was highest in the control food group before exercise and during exercise. Specifically, dogs fed the control food had 5% higher serum urea compared to either test food group or fasted control. By 60 min of exercise, urea concentration in the dogs fed the control food was 8% and 11% higher compared to dogs fed the test food or fasted. Thus dogs fed the control food before exercise are metabolizing amino acids at a higher level, but because 3-mH levels are also elevated, indicates that ingestion of the protein composition in the control food does not reduce protein catabolism during exercise.

TABLE 4

| | Treatment Groups | | |
|---|---|---|---|
| Time relative to exercise (minutes) | Control - fasted group | Control - food group | Test - food group |
| serum 3-methyl histidine-(ug/mL) 1-day exercise bout | | | |
| −30 | 1.61 +/− 0.50 | 1.61 +/− 0.45 | 1.66 +/− 0.55 |
| 0 | 1.58 +/− 0.52 | 1.67 +/− 0.89 | 1.50 +/− 0.52 |
| 60 | 1.67 +/− 0.55 | 1.80 +/− 0.45 | 1.62 +/− 0.41 |
| 120 | 1.68 +/− 0.46 | 1.87 +/− 0.44 | 1.73 +/− 0.50 |
| day 3 of 3-day exercise bout | | | |
| −30 | 1.84 +/− 0.53 | 1.73 +/− 0.55 | 1.57 +/− 0.42 |
| 0 | 1.80 +/− 0.52 | 1.66 +/− 0.50 | 1.51 +/− 0.38 |
| 60 | 1.79 +/− 0.50 | 1.78 +/− 0.54 | 1.57 +/− 0.39 |
| 120 | 1.86 +/− 0.55 | 1.75 +/− 0.53 | 1.72 +/− 0.40 |
| serum creatine kinase | | | |

TABLE 4-continued

| Time relative to exercise (minutes) | Treatment Groups | | |
|---|---|---|---|
| | Control - fasted group | Control - food group | Test - food group |
| concentration (U/L) 1-day exercise bout | | | |
| −30 | 63 +/− 19 | 84 +/− 31 | 62 +/− 13 |
| 0 | 65 +/− 22 | 75 +/− 29 | 63 +/− 17 |
| 60 | 98 +/− 38 | 118 +/− 42 | 94 +/− 30 |
| 120 | 112 +/− 33 | 147 +/− 75 | 104 +/− 36 |
| day 3 of 3-day exercise bout | | | |
| −30 | 74 +/− 21 | 81 +/− 25 | 76 +/− 10 |
| 0 | 80 +/− 27 | 85 +/− 31 | 81 +/− 13 |
| 60 | 111 +/− 39 | 115 +/− 37 | 107 +/− 15 |
| serum asparagine aminotransferase concentration (U/L) 1-day exercise bout | | | |
| −30 | 21 +/− 9 | 21 +/− 12 | 18 +/− 9 |
| 0 | 22 +/− 9 | 22 +/− 11 | 19 +/− 9 |
| 60 | 31 +/− 10 | 30 +/− 11 | 28 +/− 10 |
| 120 | 35 +/− 9 | 35 +/− 12 | 29 +/− 10 |
| day 3 of 3-day exercise bout | | | |
| −30 | 23 +/− 7 | 23 +/− 4 | 22 +/− 5 |
| 0 | 23 +/− 7 | 23 +/− 6 | 23 +/− 6 |
| 60 | 32 +/− 11 | 29 +/− 6 | 29 +/− 7 |
| 120 | 34 +/− 12 | 23 +/− 5 | 23 +/− 6 |
| serum urea concentration-(mg/dL) 1-day exercise bout | | | |
| −30 | 508 +/− 86 | 509 +/− 166 | 519 +/− 137 |
| 0 | 496 +/− 75 | 493 +/− 156 | 502 +/− 128 |
| 60 | 528 +/− 104 | 566 +/− 81 | 546 +/− 126 |
| 120 | 553 +/− 105 | 608 +/− 103 | 587 +/− 156 |
| day 3 of 3-day exercise bout | | | |
| −30 | 478 +/− 6 5 | 500 +/− 181 | 505 +/− 132 |
| 0 | 495 +/− 61 | 508 +/− 123 | 518 +/− 124 |
| 60 | 474 +/− 60 | 529 +/− 113 | 513 +/− 137 |
| 120 | 479 +/− 73 | 547 +/− 132 | 551 +/− 166 |

Mean (+/−SD) canine serum 3-methyl histidine, creatine kinase, Asparagine aminotransferase, and urea concentration at different times relative to exercise for each treatment groups Liver Cell Disruption:

The trial evaluated the appearance of alanine aminotransferase (ALT), which is largely a biomarker originating from the liver, but also in smaller amounts in the kidneys, heart, muscles, and related to cellular disruption and damage (Banfi et al., 2012). The data demonstrates that the test food formula compared to a control formula or fasted control dogs is superior in its ability to reduce liver cell disruption, as indicated by maintaining lower serum concentrations of ALT before the start of a single bout of exercise by at least 7 and 9%, respectively. After 60 and 120 min of exercise, ALT concentrations remained low in dogs fed the test food, as dogs fed the control food or fasted had 11 and 11% higher concentrations, respectively (Table 5). With continued exercise conditioning with or without pre-exercise supplementation for 3 weeks, which was followed by a 3-d exercise challenge, pre-exercise serum ALT concentrations were elevated in all groups. However, dogs fed the test food had slightly lower ALT (3-5%) concentration before the start of exercise. Dogs fed the test food were 3.5 and 4.5% lower after 60 and 120 min of exercise, respectively, compared to dogs fed the control food. The test food formula provides an even greater difference compared to fasted dogs, as ALT was 10 and 12% lower after 60 and 120 min of exercise, respectively.

TABLE 5

| serum alanine aminotransferase concentration (U/L) | Control - fasted group | Control - food group | Test - food group |
|---|---|---|---|
| 1-day exercise bout | | | |
| −30 | 48 +/− 34 | 48 +/− 19 | 44 +/− 16 |
| 0 | 47 +/− 34 | 53 +/− 33 | 44 +/− 16 |
| 60 | 52 +/− 36 | 52 +/− 21 | 46 +/− 16 |
| 120 | 52 +/− 37 | 52 +/− 21 | 46 +/− 16 |
| day 3 of 3-day exercise bout | | | |
| −30 | 61 +/− 22 | 59 +/− 19 | 58 +/− 25 |
| 0 | 60 +/− 22 | 59 +/− 21 | 57 +/− 24 |
| 60 | 65 +/− 25 | 61 +/− 22 | 58 +/− 24 |
| 120 | 65 +/− 25 | 59 +/− 20 | 57 +/− 24 |

Mean (+/−SD) canine serum alanine aminotransferase concentration at different times relative to exercise for each treatment groups.

Protein Oxidation by Reactive Nitrogen Species:

Nitric oxide (NO) in excess reacts with superoxide radical and produces stable and highly reactive peroxynitrite. The latter causes the nitration of tyrosine residues of proteins to form 3-nitrotyrosine (3-NT) and thereby alters the biological functions of proteins (Crow and Beckman, 1995, 1996). Formation of nitrotyrosine is often thought to be accompanied with acute or chronic inflammation disease, whereby level of nitric oxide is elevated (reviewed by Cai and Yan, 2013). Moreover, 3-NT gains its importance in pathological manifestations as it causes oxidative lesions to DNA bases (Murata and Kawanishi, 2004). Other than disease conditions and inflammation, the exhaustive exercise also causes cellular damage due to increased 3-NT production as a consequence of nitrosative stress. Earlier a study on human subjects performing exercise of unaccustomed intensity has documented an elevated serum and urinary 3-NT level and suggested that 3-NT might act as an important diagnostic tool to exercise-induced damage of varied intensity (Radak et al., 2003). Recent exercise research in people further demonstrated that increased formation of 3NT significantly correlated with increasing DNA damage (Sinha et al., 2010).

The trial evaluated the appearance of 3-nitrotyrosine (3NT) in serum before and during exercise. The data demonstrates that the test food formula compared to a control formula or fasted control dogs is superior in its ability to minimize 3-NT formation, as indicated by maintaining lower serum concentrations of 3-NT before the start of exercise by about 24-36% and by 37% at the end of a single 2-hr bout of exercise compared to dogs fed the control food (Table 6). Dogs fed the test food had lower 3NT concentrations compared to fasted control dogs, and demonstrated the lowest 3NT concentration at the end of exercise. Dogs fed the control food had the highest concentration of 3NT even compared to fasted control dogs.

With continued exercise conditioning with or without pre-exercise supplementation for 3 weeks, which was followed by a 3-d exercise challenge, pre-exercise 3NT concentrations on d-3 was 50-60% lower in dogs fed the test food. After 60-min of exercise, 3NT in fasted control dogs and dogs fed the control food was 39 and 37% higher compared to dogs fed the test food. At the end of exercise, 3NT concentrations were still 29-35% higher compared to dogs fed the test food.

TABLE 6

| serum 3-nitrotyrosine (ug/mL) | Control - fasted group | Control - food group | Test - food group |
|---|---|---|---|
| 1-day exercise bout | | | |
| −30 | 1.7 +/− 0.9 | 2.0 +/− 1.3 | 1.5 +/− 0.8 |
| 0 | 1.7 +/− 0.8 | 2.4 +/− 1.6 | 1.5 +/− 0.7 |
| 60 | 2.1 +/− 1.4 | 2.7 +/− 1.9 | 1.9 +/− 1.2 |
| 120 | 2.5 +/− 2.0 | 2.8 +/− 1.9 | 1.7 +/− 0.7 |
| day 3 of 3-day exercise bout | | | |
| −30 | 1.2 +/− 1.1 | 1.6 +/− 2.0 | 0.6 +/− 0.2 |
| 0 | 1.3 +/− 1.0 | 1.4 +/− 1.3 | 0.9 +/− 0.4 |
| 60 | 3.7 +/− 2.2 | 3.6 +/− 1.5 | 2.2 +/− 0.9 |
| 120 | 2.8 +/− 1.8 | 3.0 +/− 1.5 | 2.0 +/− 0.8 |

Mean (+/−SD) canine serum 3-nitrotyrosine concentration at different times relative to exercise for each treatment groups.

Cellular pH Buffering Metabolites:

Carnosine is an endogenously synthesized dipeptide of beta-alanine and histidine and is found in high concentrations in skeletal muscle. Because carnosine is inert to intracellular enzymatic hydrolysis and does not contribute to proteogenesis, it functions as a stable intracellular buffer, particularly at the pH range of high intensity exercise. Carnosine synthesis is rate-limited on the dietary availability of beta-alanine. In humans, increased levels of carnosine, through b-alanine supplementation, have been shown to increase exercise capacity and performance of several types of high-intensity exercise (Harris and Stellingwerff, 2013). Another beta-amino acid with benefits for exercise is taurine, which is demonstrated to help regulate cell hydration (Lang, 2011) and provide other physiological functions that provide anti-inflammatory and anti-oxidant support (Ripps and Shen, 2012; Ra et al., 2013)

The trial evaluated the appearance of carnosine and beta-alanine in serum before and during exercise. The data demonstrates that the test food formula compared to a control formula or fasted control dogs is superior in its ability to maintain higher serum concentrations of carnosine and b-alanine 30 min after ingestion. During exercise, carnosine concentrations were similar for dogs fed either the test food or control food, and these concentrations were. 8.7 and 7% higher compared to the fasted control dogs after 60 and 120 min of exercise, respectively (Table 7). Dogs fed the test food had the highest serum b-alanine concentration before and during exercise compared to both the fasted control dogs and dogs fed the control food.

With continued exercise conditioning with or without pre-exercise supplementation for 3 weeks, which was followed by a 3-d exercise challenge, mean pre-exercise carnosine concentration on d-3 was at least 9% higher in dogs fed the test food. After 60-min of exercise, carnosine concentration was the highest in dogs fed the test food by 7 and 12% compared to dogs fed control food and fasted, respectively. At 120-min post exercise, dogs fed either of the pre-exercise foods had higher serum carnosine concentration compared to fasted control dogs.

Dogs fed either of the pre-exercise foods had higher serum b-alanine concentrations compared to fasted control dogs, as well as during exercise.

The trial evaluated taurine concentration in serum before and during exercise. The data demonstrates that the test food formula compared to a control formula or fasted control dogs is superior in its ability to promote at least 6% higher serum concentrations of taurine 30 min after ingestion at the start of a single 2-hr bout of exercise.

With continued exercise conditioning with or without pre-exercise supplementation for 3 weeks, which was followed by a 3-d exercise challenge, mean pre-feeding and pre-exercise taurine concentration on d-3 was at least at least 6% higher in dogs fed the test food compared to dogs fed the control food and 14% higher compared to fasted control. At 30 min postprandial and immediately before starting exercise, taurine concentration was at least 7% higher in dogs fed the test food. After 60-min of exercise, taurine concentration was the highest in dogs fed the test food by 17 and 13% compared to dogs fed control food and fasted, respectively.

TABLE 7

| serum carnosine (ug/mL) | Control - fasted group | Control - food group | Test - food group |
|---|---|---|---|
| 1-day exercise bout | | | |
| −30 | 6.99 +/− 1.72 | 7.29 +/− 1.43 | 7.34 +/− 0.65 |
| 0 | 6.57 +/− 1.60 | 6.47 +/− 2.02 | 7.04 +/− 1.06 |
| 60 | 8.16 +/− 2.18 | 8.89 +/− 1.18 | 8.86 +/− 1.72 |
| 120 | 9.10 +/− 2.30 | 9.63 +/− 1.57 | 9.74 +/− 1.57 |
| day 3 of 3-day exercise bout | | | |
| −30 | 6.40 +/− 1.41 | 6.81 +/− 1.62 | 7.15 +/− 0.77 |
| 0 | 6.31 +/− 1.31 | 6.54 +/− 0.82 | 6.80 +/− 0.55 |
| 60 | 7.27 +/− 1.88 | 7.61 +/− 1.40 | 8.12 +/− 1.15 |
| 120 | 7.60 +/− 1.79 | 8.75 +/− 1.25 | 8.76 +/− 1.18 |
| Serum beta-alanine (ug/mL) | | | |
| 1-day exercise bout | | | |
| −30 | 0.54 +/− 0.14 | 0.54 +/− 0.16 | 0.57 +/− 0.12 |
| 0 | 0.46 +/− 0.12 | 0.49 +/− 0.17 | 0.53 +/− 0.12 |
| 60 | 0.59 +/− 0.24 | 0.64 +/− 0.15 | 0.68 +/− 0.16 |
| 120 | 0.62 +/− 0.17 | 0.62 +/− 0.18 | 0.65 +/− 0.12 |
| day 3 of 3-day exercise bout | | | |
| −30 | 0.79 +/− 0.17 | 0.92 +/− 0.20 | 0.90 +/− 0.10 |
| 0 | 0.59 +/− 0.16 | 0.64 +/− 0.26 | 0.63 +/− 0.21 |
| 60 | 0.88 +/− 0.18 | 0.98 +/− 0.19 | 0.97 +/− 0.18 |
| 120 | 0.95 +/− 0.22 | 1.05 +/− 0.24 | 0.98 +/− 0.21 |
| Serum taurine (ug/mL) | | | |
| 1-day exercise bout | | | |
| −30 | 23.8 +/− 4.8 | 25.3 +/− 8.6 | 26.1 +/− 5.8 |
| 0 | 24.1 +/− 4.9 | 25.9 +/− 11.7 | 27.5 +/− 7.2 |
| 60 | 19.3 +/− 6.1 | 20.8 +/− 4.7 | 20.1 +/− 8.5 |
| 120 | 17.7 +/− 3.7 | 19.6 +/− 7.9 | 18.7 +/− 7.1 |
| day 3 of 3-day exercise bout | | | |
| −30 | 17.5 +/− 3.8 | 18.8 +/− 7.2 | 20.0 +/− 3.8 |
| 0 | 17.1 +/− 3.0 | 18.4 +/− 7.1 | 19.7 +/− 3.4 |
| 60 | 16.0 +/− 3.5 | 15.4 +/− 4.6 | 18.1 +/− 5.1 |
| 120 | 15.2 +/− 7.3 | 13.6 +/− 3.7 | 14.3 +/− 2.3 |

Mean (+/−SD) canine serum carnosine, b-alanine, and taurine concentration at different times relative to exercise for each treatment groups.

The specification has disclosed typical embodiments of the invention. Although specific terms are employed, they are used in a generic and descriptive sense only, and not for purposes of limitation. The scope of the invention is set forth in the appended claims. The skilled artisan will appreciate that many modifications and variations of the claimed invention are possible in light of the above teachings. It is therefore to be understood that within the scope of the appended claims the invention may be practiced otherwise than as specifically described.

What is claimed is:

1. A method for improving exercise performance in a canine, comprising:

a. identifying a canine that will be performing exercise; and
b. administering to the canine a pre-exercise supplement in an effective amount, the pre-exercise supplement comprising (i) about 35% to about 60% protein or amino acids, comprising one or more structural proteins, one or more bioavailable proteins and one or more branched chain amino acids; (ii) about 20% to about 38% fat, comprising at least one source of medium chain triglycerides; and (iii) about 5% to about 25% carbohydrate, wherein the supplement is formulated to provide the canine with between about 1.2 g/kg BW and about 2.0 g/kg BW total nutrition, wherein the supplement is administered to the canine between about zero and about 60 minutes prior to exercise.

2. The method of claim 1, wherein the supplement is administered to the canine between about zero and about 30 minutes prior to exercise.

3. The method of claim 1, wherein the structural protein in the supplement includes animal muscle.

4. The method of claim 3, wherein the muscle is heart muscle.

5. The method of claim 1, wherein the bioavailable protein in the supplement is selected from whey, partially hydrolyzed soy and hydrolyzed amino acids, or any combination thereof.

6. The method of claim 1, wherein the branched chain amino acids in the supplement include L-leucine.

7. The method of claim 1, wherein the source of medium chain triglycerides in the supplement is coconut oil.

8. The method of claim 1, wherein the carbohydrate in the supplement comprises complex carbohydrates.

9. The method of claim 1, wherein administration of the supplement does not cause a substantial increase in blood insulin.

10. The method of claim 1, wherein, relative to a control animal not receiving the supplement, the blood level of branched chain amino acids is increased 30 to 60 minutes after the animal ingests the supplement.

11. The method of claim 1, wherein the supplement comprises leucine and, relative to a control animal not receiving the supplement, the blood level of the leucine is increased 30 to 60 minutes after the animal ingests the supplement.

12. The method of claim 1, wherein the effective amount provides at least one of the following: (1) increased BCAA in the blood within 30 minutes following administration, (2) increased leucine in the blood within 30 minutes following administration; (3) increased availability of free fatty acids or glycerol for exercising muscles as measured by an increase of the free fatty acids or the glycerol in blood circulating levels; (4) insulin secretion of no more than 5% increase following administration; (5) reduction of activity-induced protein catabolism; (6) increased protein biosynthesis (7) stable or increased blood oxygenation, (8) reduced production of at least one stress hormone; (9) reduced production of protein oxidation products, (10) increased or reduced-depletion of endogenous pH buffering agents including beta-alanine or carnosine; and (11) reduced fatigue or reduced soreness.

* * * * *